United States Patent
Subramanyam et al.

(10) Patent No.: US 10,877,934 B2
(45) Date of Patent: Dec. 29, 2020

(54) EFFICIENT BACKUP OF COMPACTION BASED DATABASES

(71) Applicant: Rubrik, Inc., Palo Alto, CA (US)

(72) Inventors: Rajath Subramanyam, San Jose, CA (US); Pin Zhou, San Jose, CA (US); Prasenjit Sarkar, Los Gatos, CA (US); Rohit Shekhar, Sunnyvale, CA (US); Hyojun Kim, San Jose, CA (US)

(73) Assignee: RUBRIK, INC., Palo Alto, CA (US)

(*) Notice: Subject to any disclaimer, the term of this patent is extended or adjusted under 35 U.S.C. 154(b) by 181 days.

(21) Appl. No.: 15/637,374

(22) Filed: Jun. 29, 2017

(65) Prior Publication Data

US 2019/0005059 A1 Jan. 3, 2019

(51) Int. Cl.
*G06F 17/00* (2019.01)
*G06F 16/174* (2019.01)
*G06F 11/14* (2006.01)
*G06F 16/11* (2019.01)

(52) U.S. Cl.
CPC ...... *G06F 16/1744* (2019.01); *G06F 11/1451* (2013.01); *G06F 11/1458* (2013.01); *G06F 16/116* (2019.01); *G06F 2201/80* (2013.01); *G06F 2201/835* (2013.01); *G06F 2201/84* (2013.01)

(58) Field of Classification Search
CPC .. G06F 16/2255; G06F 16/285; G06F 16/951; G06F 3/0482; G06F 3/0619; G06F 3/167
See application file for complete search history.

(56) References Cited

U.S. PATENT DOCUMENTS

| | | | |
|---|---|---|---|
| 2010/0262765 A1* | 10/2010 | Cheon | G06F 3/0613 711/103 |
| 2011/0082972 A1 | 4/2011 | Cherkasova et al. | |
| 2015/0120656 A1 | 4/2015 | Ramnarayanan et al. | |
| 2015/0339314 A1* | 11/2015 | Collins | G06F 16/1744 707/627 |
| 2016/0217163 A1 | 7/2016 | Thakur et al. | |
| 2018/0253357 A1* | 9/2018 | Varley | G06F 11/1451 |

OTHER PUBLICATIONS

PCT International Search Report and Written Opinion, PCT Application No. PCT/US2018/39866, dated Sep. 21, 2018, 11 pages.
"International Application Serial No. PCT US2018 039866, International Search Report dated Sep. 21, 2018", 2 pgs.
"International Application Serial No. PCT US2018 039866, Written Opinion dated Sep. 21, 2018", 4 pgs.
"International Application Serial No. PCT US2018 039866, International Preliminary Report on Patentability dated Jan. 9, 2020", 6 pages.
"European Application Serial No. 18824074.1, Extended European Search Report dated Jun. 2, 2020", 7 pages.

* cited by examiner

*Primary Examiner* — Truong V Vo
(74) *Attorney, Agent, or Firm* — Schwegman Lundberg & Woessner, P.A.

(57) ABSTRACT

Embodiments disclosed herein provide systems, methods, and computer readable media for sub-cluster recovery in a data storage environment having a plurality of storage nodes. In a particular embodiment, the method provides scanning data items in the plurality of nodes. While scanning, the method further provides indexing the data items into an index of a plurality of partition groups. Each partition group includes data items owned by a particular one of the plurality of storage nodes. The method then provides storing the index.

20 Claims, 10 Drawing Sheets

EFFICIENT BACKUP OF COMPACTION BASED DATABASES

TECHNICAL FIELD

Many modern database systems are based on architectures that use Sorted String Tables (SSTables) to store data entries therein. Examples of such systems include Cassandra, LevelDB, RocksDB, and BigTable database systems. SSTables were implemented, in part, to overcome relatively slow writes allowed by B-Tree based database systems. An SSTable is an immutable data file that is sorted by database keys. As such, any edits or writes that need to be made to a particular SSTable instead creates a new SSTable with those writes or edits reflected in the new SSTable.

Since a new SSTable is created every time an SSTable is changed, much of the data in a new SSTable is also contained in a previously created SSTable. Most, if not all, databases that use SSTables, therefore, perform compactions to conserve storage space for newly created SSTables. Compaction combines multiple SSTables into a single new SSTable by only copying still valid data entries into the new SSTable and then deletes the source SSTables. Thus, after compaction, the storage space previously taken up by no-longer valid data entries, and duplicates of valid data entries, can now be used for other purposes (i.e., storing additional SSTables).

Typically, when incrementally backing up data of any kind, only changes from a previous back up are copied since unchanged data will have already been copied in that previous backup. That procedure typically does not change when backing up a compaction based database. If new SSTables exists since a previous incremental backup was made, only those new SSTables are copied in the current backup. However, one or more of the new SSTables may be compactions of previously backed up SSTables. As such, the compacted SSTables, while seemingly new to the backup system, include data entries already backed up in previous SSTables. Hence, while copying a compacted SSTable does not store a duplicate file, copying a compacted SSTable does store duplicate data entries, which constitutes an inefficient use of storage space.

Overview

Embodiments disclosed herein provide systems, methods, and computer readable media for efficiently performing incremental backups of compaction based databases. In a particular embodiment, the method includes backing up two or more files from a first database system and, after backing up the two or more files, identifying a subsequent file from the first database system for backup. The method further provides determining that the subsequent file comprises a compaction of the two or more files and, responsively, refraining to back up the subsequent file.

In some embodiments, backing up the two or more files comprises at a first time, backing up one or more first files and, after the first time, identifying a second file for backup. Those embodiments further include determining that the second file does not comprise a compaction of the one or more first files and, responsively, backing up the second file.

In some embodiments, the subsequent file comprises a compaction of the two or more files when the subsequent file contains only information included in the two or more files.

In some embodiments, determining that the subsequent file comprises a compaction of the two or more files comprises accessing ancestor information for the subsequent file and determining that the ancestor information indicates that the subsequent file was created by compacting the two or more files. In those embodiments, when backing up the two or more files, the method may further include adding ancestry information to an ancestry map and, after determining that the subsequent file was created by compacting the two or more files, using the ancestry information to determine that the two or more files have already been backed up. Also in those embodiments, the method may include adding subsequent ancestry information about the subsequent file to the ancestry map. The subsequent ancestry information indicates that the two or more files are ancestors of the subsequent file.

In some embodiments, determining that the subsequent file comprises a compaction of the two or more files comprises determining a first maximum timestamp for data entries in the subsequent file and determining that the first maximum timestamp is not greater than a maximum timestamp for data entries in the two or more files.

In some embodiments, the method includes identifying the subsequent file for restoration to the first database system, compacting the two or more files to recreate the subsequent file, and restoring the subsequent file to the first database system.

In some embodiments, the method includes identifying the subsequent file for restoration to the first database system, determining that the two or more files are ancestors of the subsequent file, and restoring the two or more files to the first database system.

In some embodiments, the two or more files and the subsequent file comprise Sorted String Tables (SSTables).

In another embodiment, a system is provided having one or more computer readable storage media and a processing system operatively coupled with the one or more computer readable storage media. Program instructions stored on the one or more computer readable storage media, when read and executed by the processing system, direct the processing system to back up two or more files from a first database system and, after backing up the two or more files, identify a subsequent file from the first database system for backup. The program instructions further direct the processing system to determine that the subsequent file comprises a compaction of the two or more files and, responsively, refrain to back up the subsequent file.

In yet another embodiment, a computer readable storage medium is provided having program instructions stored thereon. The program instructions, when executed by a processing system, direct the processing system to back up two or more files from a first database system and, after backing up the two or more files, identify a subsequent file from the first database system for backup. The program instructions further direct the processing system to determine that the subsequent file comprises a compaction of the two or more files and, responsively, refrain to back up the subsequent file.

DETAILED DESCRIPTION

The incremental backup technology described herein mitigates the storage space inefficiencies caused when incrementally backing up a compaction based database system. In particular, when backing up a compaction based database, the examples herein determine whether a file (e.g., an SSTable) being backed up is a compaction of two or more files that were backed up in a previous incremental backup. If the file is a compaction, then the file is not copied since all the entries within the file are already stored in backups of other files (i.e., the files from which the compacted file was created). Instead, a record, called an ancestry map herein, is kept to indicate the files that were compacted to create the compacted file. Should the compacted file ever need to be recovered, the record is used to identify the files that were copied to retrieve the data entries in the compacted file.

Figure 1:
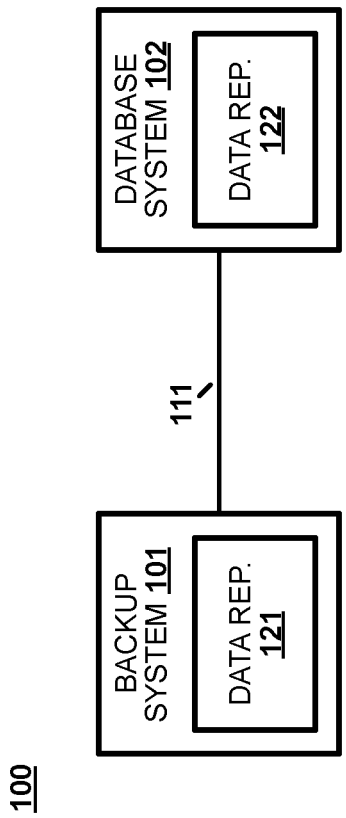
FIG. 1 illustrates an implementation for efficiently backing up a compaction based database system.

FIG. 1 illustrates implementation 100 for efficiently backing up a compaction based database system. Implementation 100 includes backup system 101, database system 102, data repository 121, and data repository 122. Backup system 101 and database system 102 communicate over communication link 111.

In operation, database system 102 hosts a database that stores data entries in immutable files that may be compacted to conserve storage space in data repository 122. Hence, database system 102 is a compaction based database system. Backup system 101 is tasked with incrementally backing up the database files stored in data repository 122. To that end, backup system 101 identifies any file changes that have occurred since the most recent backup and copies those file changes, if necessary, to data repository 121. Specifically, backup system 101 only copies file changes (i.e., new files in the case of the immutable database files described herein) that include data entries not already stored in data repository 121. Thus, if backup system 101 identifies a new file and that file is a compaction of files already stored in data repository 121, then backup system 101 refrains from copying that new file to data repository 121. If, however, the new file is not a compaction of other files or is a compaction of at least one file that was not already copied in a previous backup, then backup system 101 will copy the file as not all data entries in the new file have been copied to data repository 121.

Figure 2:
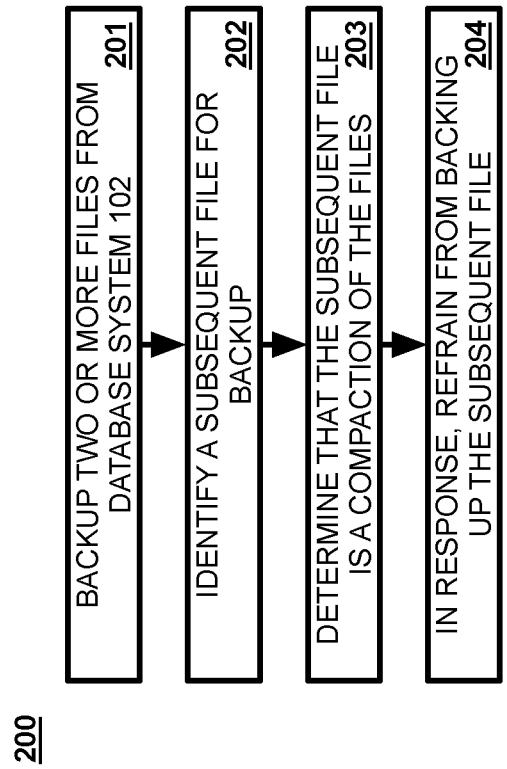
FIG. 2 illustrates a scenario for the implementation to efficiently back up a compaction based database system.

FIG. 2 illustrates a scenario 200 for implementation 100 to efficiently back up a compaction based database system. In scenario 200, backup system 101 backs up two or more files from database system 102 (201). Each of the two or more files comprises a file in data repository 122 that includes at least one data entry that was not previously copied in an ancestor of the file already stored in data repository 121 by backup system 101. The files may be SSTables, which is a common format for compaction based database systems, but may be some other type of immutable database file. The files may be backed up during the same incremental backup of database system 102, may be backed up during different incremental backups of database system 102, or may be backed up during an initial backup that includes all contents of data repository 122.

After backing up the two or more files, backup system 101 identifies a subsequent file from database system 102 to backup (202). The subsequent file may be identified during an incremental backup subsequent to one or more incremental backups that copied the two or more files to data repository 121. The subsequent file comprises a file that is new to data repository 122 since the previous incremental backup was performed. Rather than blindly copying the subsequent file to data repository 121, backup system 101 first determines that the subsequent file comprises a compaction of the two or more files (203). As such, the data entries in the subsequent file have already been stored in data repository 121 by virtue of the two or more files having already been stored in data repository 121 along with data entries of the two or more files that are no longer valid and were discarded during compaction. To determine that the subsequent file comprises a compaction of the two or more files, backup system 101 may reference ancestry information about the subsequent file that is maintained by database system 102. For instance, after identifying the subsequent file, backup system 101 may query database system 102 for the subsequent file's ancestry information that indicates whether the subsequent file is a compaction of other files and, if so, which files are the ancestors of the subsequent file. In this case, the ancestry information indicates that the two or more files backed up at step 201 are the ancestors of the subsequent file and backup system 101 can reference its own records to determine that the two or more files have already been copied to data repository 121.

Therefore, in response to determining that the subsequent file is a compaction of the two or more files, backup system 101 refrains from backing up the subsequent file (204). In some examples, backup system 101 further maintains a map of ancestry information that indicates that the subsequent file was not copied and indicates that the two or more files are the ancestors of the subsequent file. This map maintains a list of all files backed up to data repository 121 and indicates to backup system 101 whether a file itself has already been copied or data that makes up the file has already been copied previously in ancestors of the file. As such, backup system 101 may use the ancestry map when performing step 203 above. In addition to using the ancestry map to determine whether backup system 101 should refrain from backing up a particular file due to that file's ancestors already being backed up, the ancestry map may also be used when accessing the file at a future time. That is, should the subsequent file ever need to be accessed (e.g., for restoration to data repository 122), backup system 101 can reference the ancestry map to identify the two or more files so that the data entries of the subsequent file can be reproduced. In some cases, backup system 101 may compact the two or more files itself to provide the subsequent data file for access or backup system 101 may provide the two or more files to database system 102 so that database system 102 can compact or otherwise handle the two or more files.

Advantageously, refraining from copying the subsequent file to data repository 121 conserves storage space in data repository 121 along with any other resources needed to copy the subsequent file to data repository 121, such as the processing resources used to process the subsequent file before the subsequent file is stored in data repository 121. Backup system 101 is therefore more efficient while still managing to incrementally backup compacted database files.

Referring back to FIG. 1, backup system 101 comprises a computer system and communication interface. Backup system 101 may also include other components such as a router, server, data storage system, and power supply. Backup system 101 may reside in a single device or may be distributed across multiple devices. Backup system 101 could be an application server(s), a personal workstation, or some other network capable computing system—including combinations thereof. While shown separately, all or portions of backup system 101 could be integrated with the components of database system 102.

Database system 102 comprises a computer system and communication interface. Database system 102 may also include other components such as a router, server, data storage system, and power supply. Database system 102 may reside in a single device or may be distributed across multiple devices, as is common with nodes of distributed databases. Database system 101 could be an application server(s), a personal workstation, or some other network capable computing system—including combinations thereof. While shown separately, all or portions of database system 102 could be integrated with the components of database system 102. Either or both of backup system 101 and database system 102 may be implemented as cloud based systems.

Data repositories 121 and 122 each comprise one or more data storage systems having one or more non-transitory storage medium, such as a disk drive, flash drive, magnetic tape, data storage circuitry, or some other memory apparatus. The data storage systems may also include other components such as processing circuitry, a network communication interface, a router, server, data storage system, and power supply. The data storage systems may reside in a single device or may be distributed across multiple devices. For instance, in the case of database system 102 being a distributed database, the storage media may be distributed across nodes of the distributed database. In some cases, data repositories 121 and 122 may be physically incorporated into backup systems 101 and database system 102, respectively. It should be understood that in no case is the storage media a propagated signal. Either or both of data repositories 1021 and 122 may be implemented as cloud based storage systems.

Communication link 111 could be internal system busses or use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof. Communication link 111 could be a direct link or may include intermediate networks, systems, or devices.

Figure 3:
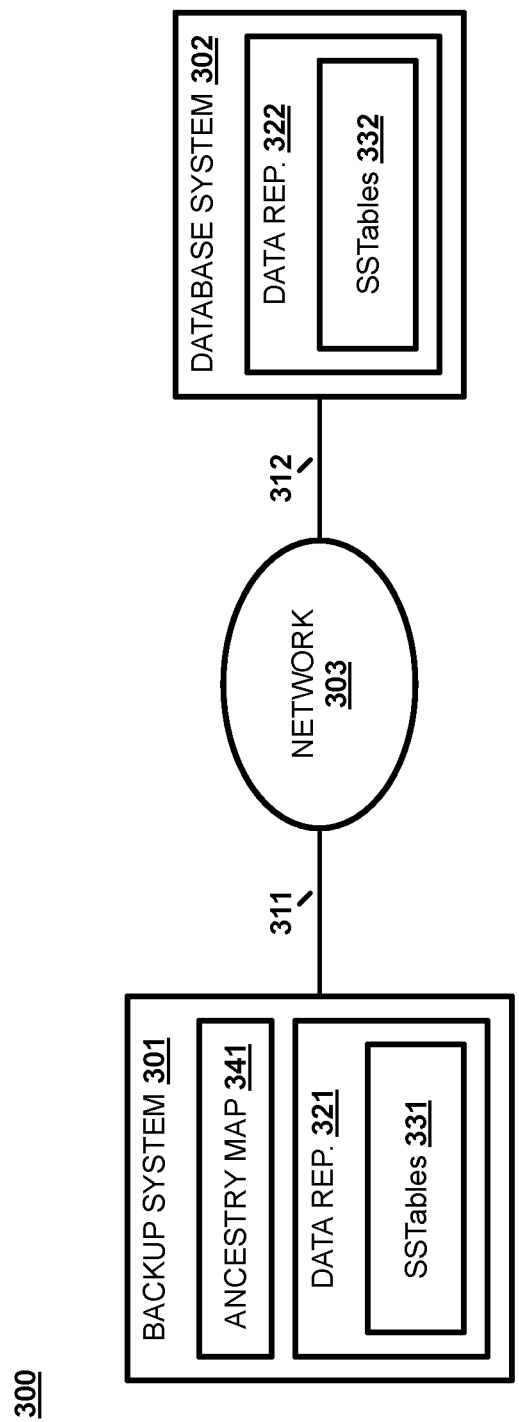
FIG. 3 illustrates another implementation for efficiently backing up a compaction based database system.

FIG. 3 illustrates implementation 300 for efficiently backing up a compaction based database system. Implementation 300 includes backup system 301, database system 302, and communication network 303. Backup system 301 includes data repository 321 storing SSTables 331 and ancestry map 341. While ancestry map 341 is shown outside of data repository 321, ancestry map 341 may be stored in data repository 321 along with SSTables 331. Database system 302 includes data repository 322 storing SSTables 332.

In operation, backup system 301 incrementally backs up SSTables 332 and stores any SSTables copied in each incremental backup within SSTables 331. Backup system 301 identifies and retrieves new SSTables at each backup increment via communications exchanged over communication network 303, which may include one or more Local Area Networks (LANs), Wide Area Networks (WANs), the Internet, or some other type of communication network over which data may be transferred—including combinations thereof. Database system 302 is a compaction based database system due to its use of immutable SSTables to store data entries. Thus, backup system 301 uses ancestry map 341 to track SSTable ancestry information so that SSTables with ancestors that have all previously been copied to data repository 321 are not copied again.

Figure 4:
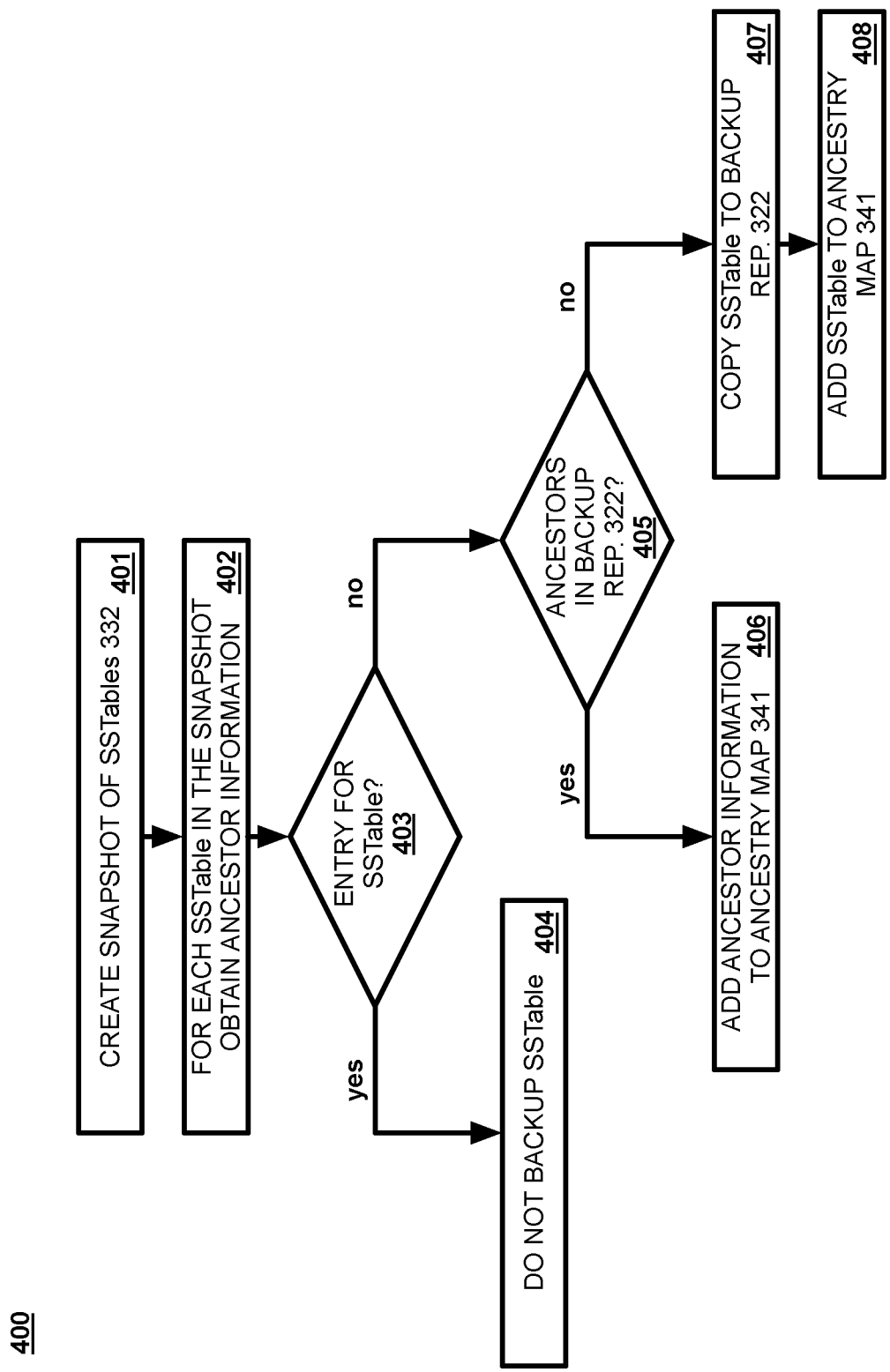
FIG. 4 illustrates a scenario for the other implementation to efficiently back up a compaction based database system.

FIG. 4 illustrates scenario 400 for implementation 300 to efficiently back up a compaction based database system. In scenario 400, backup system 301 creates a snapshot of SSTables 332 (401). At this point, the snapshot may be created in the same manner as a conventional incremental backup system would create a snapshot of SSTables in a database. However, while a conventional incremental backup system would simply copy and store SSTables that have changed since the previous backup snapshot, backup system 301 determines whether the data entries in the changed SSTables have already been copied to data repository 321. To that end, backup system 301 obtains ancestor information about the SSTables in the snapshot from database system 302 (402). The ancestor information is generated and maintained by database system 302. In some cases, an SSTable that has no ancestors (i.e., is not a compaction of other SSTables) will not have ancestor information or the ancestor information for that SSTable may indicate that no ancestors exist (e.g., have a NULL value). The ancestor information may be included as metadata with each SSTable or may be maintained elsewhere by database system 302 either in data repository 322 or in some other storage component accessible by database system 302.

For each SSTable of the snapshot, backup system 301 determines whether the SSTable is already stored in data repository 321 (403). Backup system 301 may reference the ancestry map 341 to determine whether the SSTable has already been stored or may determine whether the SSTable is already stored in some other manner. If the SSTable has already been stored in data repository 321, then backup system 301 does not copy the SSTable to data repository 321 because the SSTable is not a change to SSTables 332 since the previous backup (404). In contrast, if the SSTable has not been stored in data repository 321, then backup system 301 determines whether all ancestors of the SSTable are already stored in data repository 321 (405). Backup system 301 makes the aforementioned determination of step 405 rather than simply copying the SSTable to data repository 321.

To determine whether the ancestors of the SSTable are already stored in data repository 321, backup system 301 references ancestry map 341 with the ancestry information for the SSTable. In particular, ancestry map 341 comprises a record of each SSTable that has been backed up, but not necessarily copied to data repository 321, from database system 302. That is, ancestry map 341 indicates whether a particular SSTable has already been copied to data repository 321 or, if the SSTable has not been copied, which SSTables of SSTables 331 are ancestors of the non-copied SSTable (i.e., the SSTables that were compacted to create the non-copied SSTable). Backup system 301 cross references the ancestor information of the SSTable currently being processed with the information in ancestry map 341. If all ancestors of the SSTable, as indicated by the SSTable's ancestry information, have entries in ancestry map 341, then backup system 301 determines that the SSTable does not need to be copied to data repository 321 since the data entries therein are already copied by virtue of their inclusion in the ancestor SSTables. Thus, rather than copying the SSTable, database system 302 adds another entry to ancestry map 341 for the SSTable and lists the ancestors of the SSTable in that entry (406). If necessary, the ancestry of the SSTable can then be traced at a later time based on that entry in ancestry map 341. Ancestry map 341 may include pointers to the entries within ancestry map 341 of the ancestors.

If one or more of the ancestors of the SSTable, as indicated by the SSTable's ancestry information, are not included in ancestry map 341 or, if the SSTable has no ancestors, then backup system 301 copies the SSTable to data repository 321 for inclusion in SSTables 331 (407). Additionally, backup system 301 adds an entry to ancestry map 341 for the SSTable (408). In this case, since the SSTable is copies to data repository 321, rather than including ancestry information for the SSTable, backup system 301 indicates in the entry that the SSTable has been copied and is therefore stored in data repository 321. The entry for the SSTable in ancestry map 341 may include a pointer to the SSTable in data repository 321.

Processing each SSTable from the snapshot in the manner described above using steps 403-408 conserves storage space in data repository 321 by not copying (i.e., storing) any SSTable that can be reproduced using SSTables already stored in data repository 321 (i.e., that SSTable's ancestor).

In some examples, database system 302 may not maintain ancestor information and backup system 301 may instead rely on timestamps, instead of ancestor information provided by database system 302, to filter out (and not back up) SSTables compacted from ancestors already backed up. For each backup interval, backup system 301 notes the max timestamp among all of the SSTables already backed up. The max timestamp of a particular SSTable comprises the newest (which is also the highest/max) timestamp from all data entries inside the SSTable. For the backup interval, after creating a snapshot (step 401), the backup system compares the max timestamp of each SSTable with the max timestamp determined by backup system 301 during the previous backup interval. Since a compacted SSTable comprises only data entries also included in SSTables compacted to form the compacted SSTable, it logically follows that the compacted SSTable will not have a max timestamp greater than those ancestor SSTables. Thus, if the max timestamp of a SSTable from the snapshot is greater than the max timestamp of the previous interval, backup system 301 knows that the SSTable includes data entries not already backed up in other SSTables and copies and processes the SSTable from the snapshot. Otherwise, backup system 301 will refrain from backing up the SSTable from the snapshot. The above example will continue to work properly as long as the time used by database system 302 when creating timestamps does not drift too much one way or another.

Figure 5:
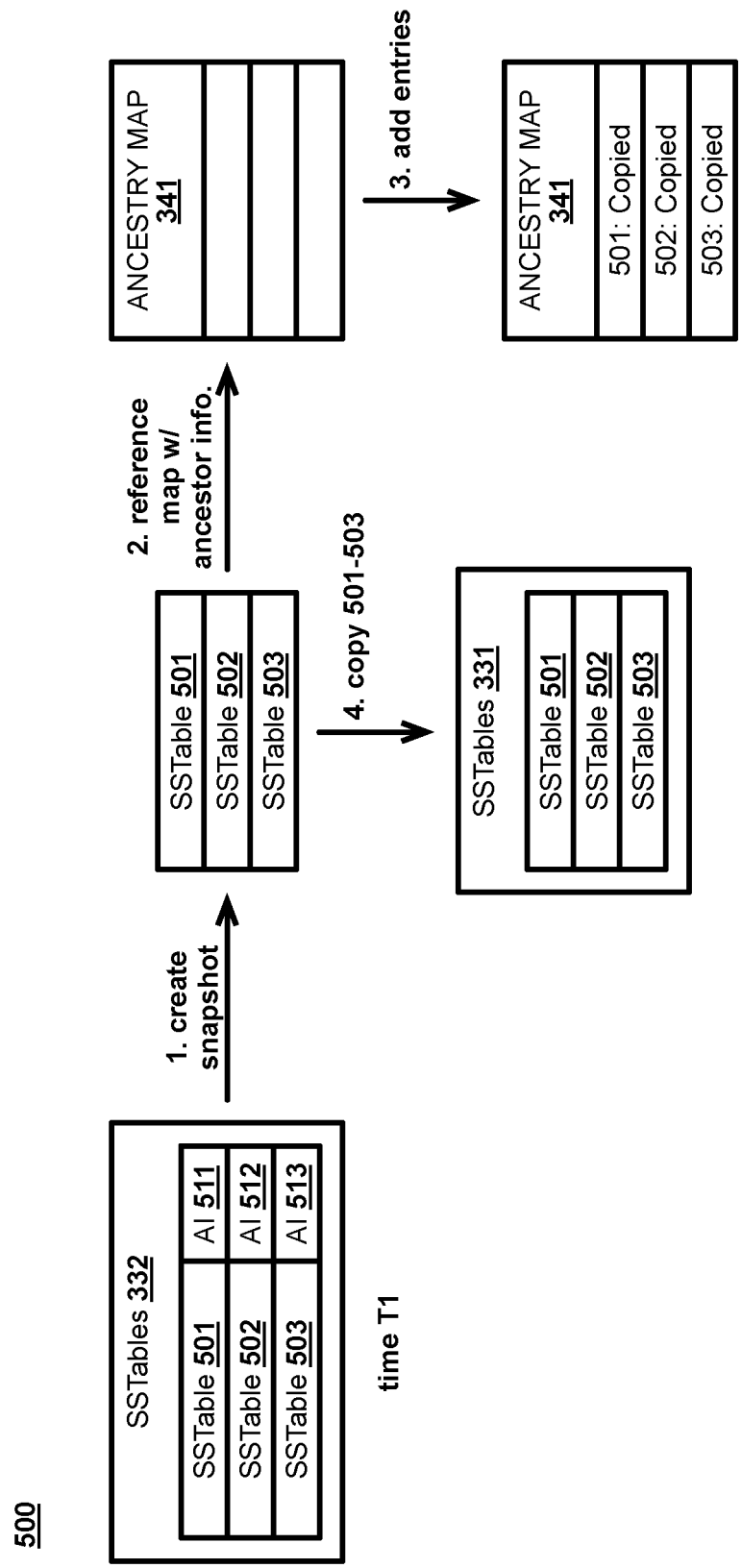
FIG. 5 illustrates another scenario for the other implementation to efficiently back up a compaction based database system.

FIG. 5 illustrates scenario 500 for implementation 300 to efficiently back up a compaction based database system. Scenario 500 is an example of how scenario 400 may be applied to an example set of SSTables 332. In particular, SSTables 332 include SSTables 501-503 at time T1. It should be understood that the three SSTables used in scenario 500 is merely exemplary and any number of SSTables may exist in SSTables 332. At step 1, backup system 301 creates a snapshot of SSTables 332 at time T1. For each of SSTables 501-503 in the snapshot, backup system 301 references ancestry map 341 at step 2 with respective ancestor information 511-513. In this example, the ancestor information for each SSTable 501-503 comprises metadata associated with, and received with, each SSTable 501-503, although, other manners of maintaining ancestry information may be used by database system 302. Ancestry map 341 is shown as empty for the purposes of this example because no entries therein indicate that all ancestors of each SSTable 501-503 are accounted for therein (SSTables also may not be compactions and, therefore, may not have any ancestors). In some cases, scenario 500 may be an initial backup of SSTables 332 and, therefore, ancestry map 341 may actually be empty.

As a result of step 2, backup system 301 determines that SSTables 501-503 should be copied to SSTables 331 in data repository 321 and adds entries for SSTables 501-503 to ancestry map 341 at step 3. The entries indicate that SSTables 501-503 have been copied to data repository 321 and are, therefore, included in SSTables 331. Backup system 301 also copies SSTables 501-503 to data repository 321 at step 4. Upon completion of steps 1-4, an incremental backup of SSTables 332, as they were at time T1, is complete. It should be understood that adding entries to ancestry map 341 (step 3) and copying SSTables to data repository 321 (step 4) may occur in any order or at substantially the same time.

Figure 6:
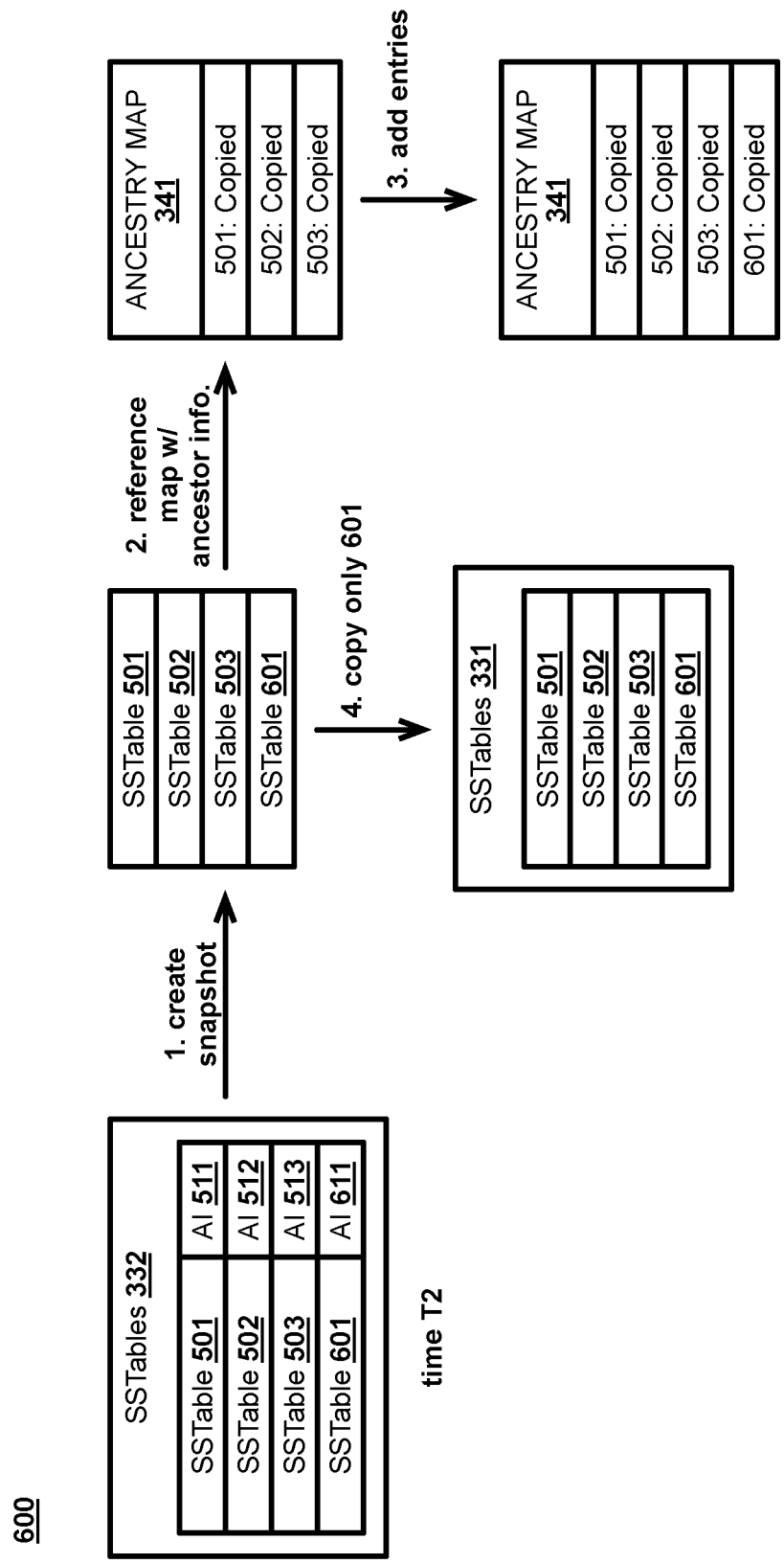
FIG. 6 illustrates another scenario for the other implementation to efficiently back up a compaction based database system.

FIG. 6 illustrates scenario 600 for implementation 300 to efficiently back up a compaction based database system. Scenario 600 is a continuation of scenario 500. Specifically, at time T2, which is after time T1, SSTables 332 include SSTables 501-503 and SSTable 601. At step 1, backup system 301 creates a snapshot of SSTables 332 at time T2. The snapshot includes SSTables 501-503 and SSTable 601. Backup system 301 references ancestry map 341 at step 2 to determine whether any of SSTables 501-503 and SSTable 601 should be copied to data repository 321. In view of step 403 of scenario 400, ancestor information 511-513 for SSTables 501-503 may not even be used during step 2 of scenario 600. Rather, backup system 301 references ancestry map 341 to determine that SSTables 501-503 have already been copied without needing to consider their ancestry. However, ancestor information 611 of SSTable 601 is used by backup system 301 to determine whether SSTable 601 should be copied. In this case, SSTable 601 is not a compaction of other SSTables and ancestor information 611 indicates that fact. Therefore, backup system 301 determines that SSTable 601 should be copied to data repository 321.

In response to the above determination, backup system 301 adds an entry to ancestry map 341 for SSTable 601 at step 3. The entry indicates that SSTable 601 has been copied to data repository 321. Accordingly, backup system 301 copies SSTable 601 to data repository 321 at step 4 to join SSTables 501-503 in SSTables 331, which were copied previously. Upon completion of steps 1-4, an incremental backup of SSTables 332, as they were at time T2, is complete. It should be understood that adding entries to ancestry map 341 (step 3) and copying SSTables to data repository 321 (step 4) may occur in any order or at substantially the same time.

Figure 7:
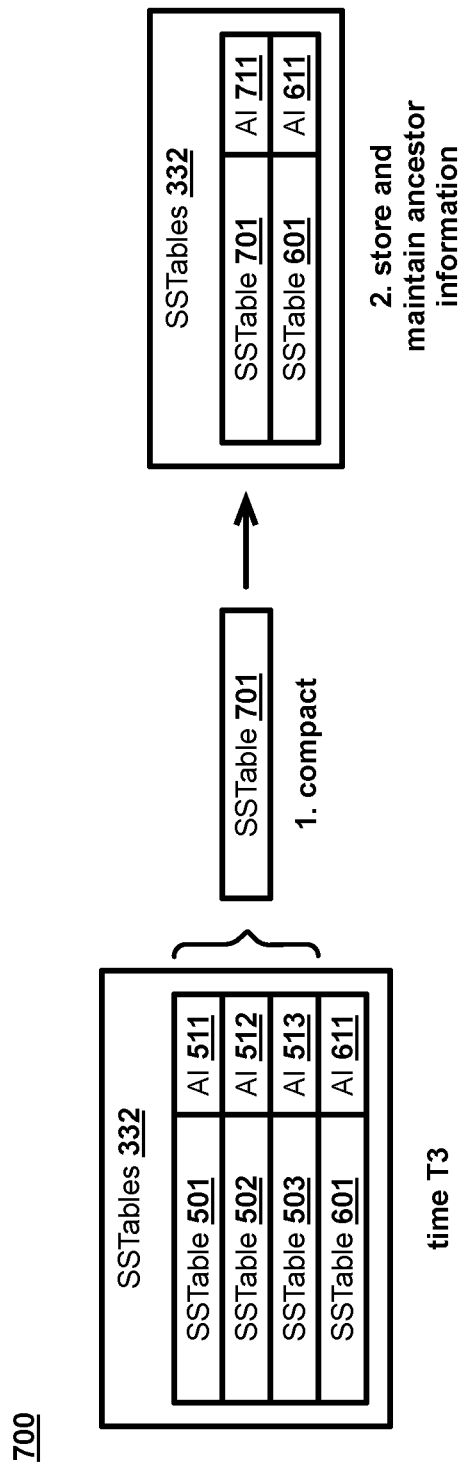
FIG. 7 illustrates another scenario for the other implementation to efficiently back up a compaction based database system.

FIG. 7 illustrates scenario 700 for implementation 300 to efficiently back up a compaction based database system. Scenario 700 is a continuation of scenario 600. At time T3, which is after time T2, database system 302 compacts SSTables 501-503 at step into SSTable 701. Database system 302 may use any method of data compaction that results in the still valid data entries of SSTables 501-503 being replicated in SSTable 701 while not replicating those entries that are no longer valid. The newly created SSTable 701 is stored in data repository 322 along with corresponding ancestor information 711, which indicates that SSTables 501-503 are the ancestors of SSTable 701 (i.e., the SSTables that were compacted to create SSTable 701). Thus, after the compaction, SSTables 332 now include SSTable 601 and SSTable 701 in place of SSTables 501-503.

Figure 8:
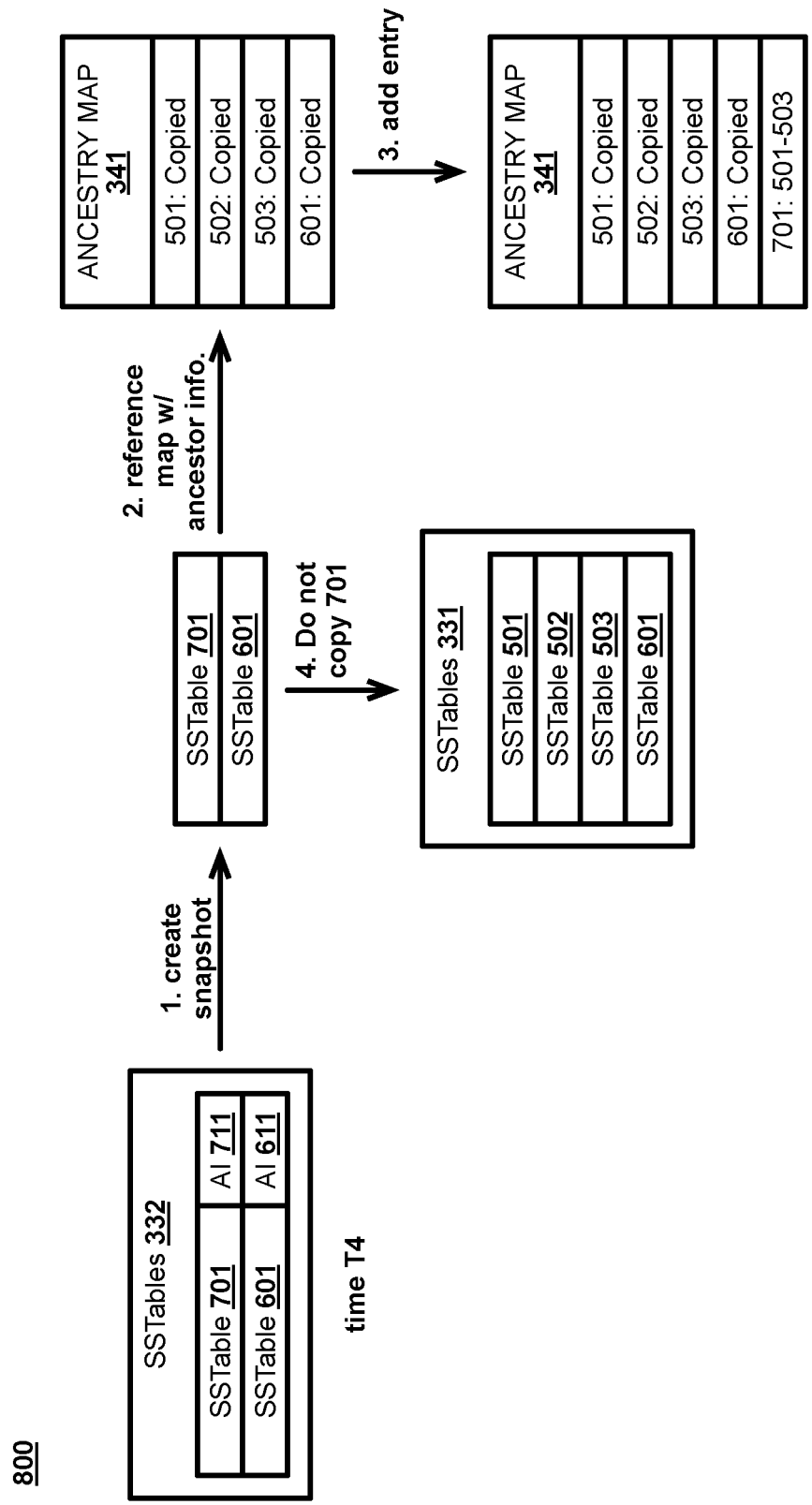
FIG. 8 illustrates another scenario for the other implementation to efficiently back up a compaction based database system.

FIG. 8 illustrates scenario 800 for implementation 300 to efficiently back up a compaction based database system. Scenario 800 is a continuation of scenario 700. Specifically, at time T4, which is after time T3, SSTables 332 include SSTable 701 and SSTable 601. At step 1, backup system 301 creates a snapshot of SSTables 332 at time T4. The snapshot includes SSTable 701 and SSTable 601. Backup system 301 references ancestry map 341 at step 2 to determine whether any of SSTable 701 and SSTable 601 should be copied to data repository 321. In view of step 403 of scenario 400, ancestor information 611 for SSTable 601 may not even be used during step 2 of scenario 800. Rather, backup system 301 references ancestry map 341 to determine that SSTable 601 has already been copied without needing to consider SSTable 601's ancestry. However, ancestor information 711 of SSTable 701 is used by backup system 301 to determine whether SSTable 701 should be copied.

In this case, SSTable 701 is a compaction of SSTables 501-503, as described above, and ancestor information 711 indicates that fact to backup system 301. Therefore, backup system 301 determines whether all of SSTables 501-503 have entries in ancestry map 341. Since ancestry map 341 does include entries for SSTables 501-503, backup system 301 determines that SSTable 701 does not need to be copied to data repository 321 and, therefore, does not copy SSTable 701 for inclusion in SSTables 331. Instead, backup system 301 adds an entry at step 3 for SSTable 701 to ancestry map 341. The entry indicates that SSTables 501-503 are the ancestors of SSTable 701 so that SSTable 701 does not need to be copied at step 4. Upon completion of steps 1-4, an incremental backup of SSTables 332, as they were at time T4, is complete even though SSTable 701 was not copied to data repository 321. Rather, SSTable 701's entry in ancestry map 341 provides enough information to replicate SSTable 701 from its ancestors.

In scenario 800, the ancestors of SSTable 701 (i.e., SSTables 501-503) all have entries in ancestry map 341 that indicate that the ancestors themselves were copied to data repository 321. However, in other examples, one or more of the entries may indicate further ancestors. For instance, if SSTable 701 is compacted with one or more other SSTables at some later time, then the SSTable created by that compaction, when backed up, would refer to SSTable 701's entry in ancestry map 341. While backup system 301 may trace such ancestry information all the way back to SSTables that were actually stored in data repository 321, the process for adding entries to ancestry map 341 (i.e., scenario 400) allows backup system 301 to assume that ancestors actually copied to data repository 321 will eventually be found if traced back through ancestry entries. Such an assumption prevents backup system 301 from having to perform such an ancestry trace until an SSTable needs to be accessed (e.g., for restoration to database system 302).

Figure 9:
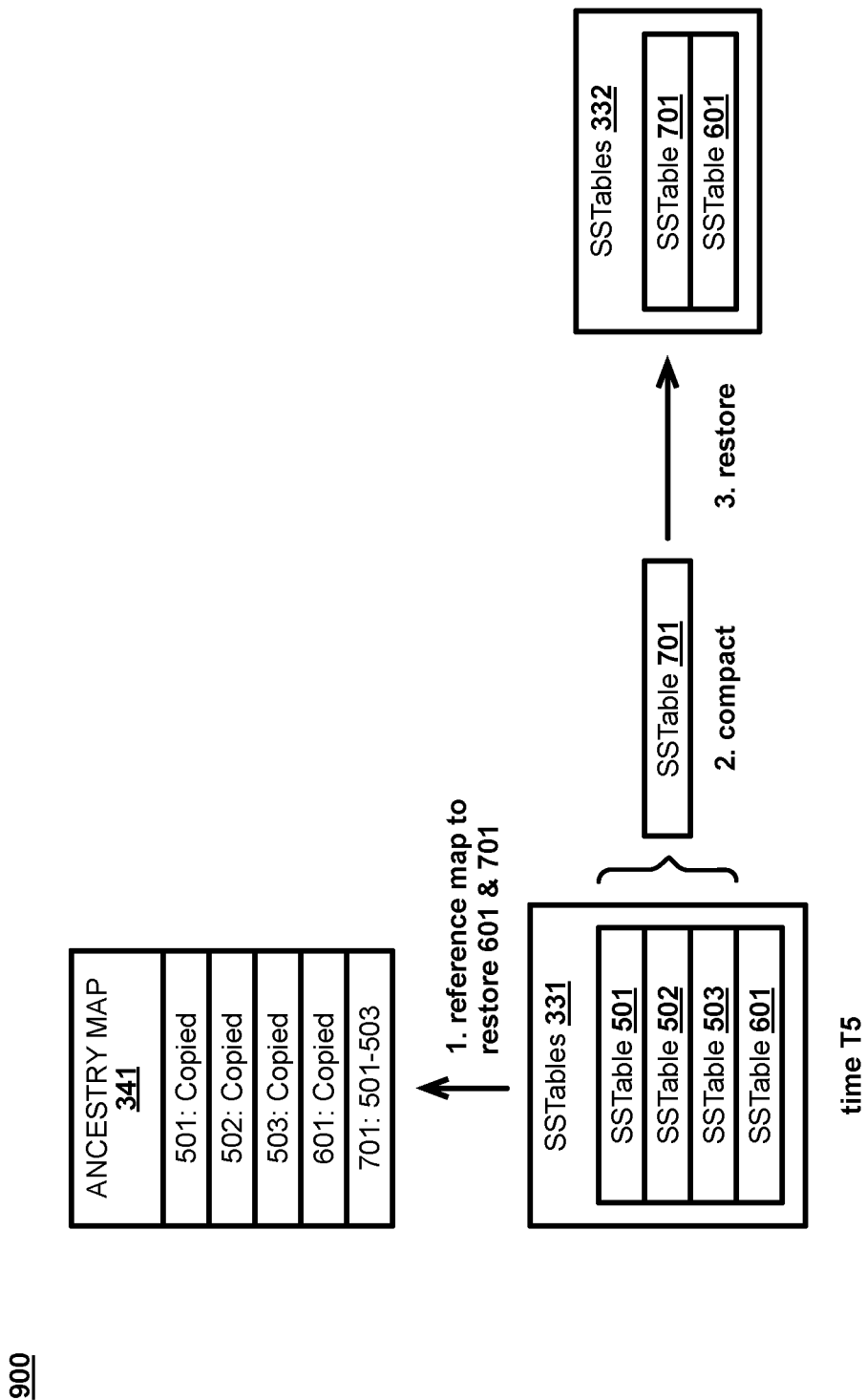
FIG. 9 illustrates another scenario for the other implementation to efficiently back up a compaction based database system.

FIG. 9 illustrates scenario 900 for implementation 300 to efficiently back up a compaction based database system. Specifically, scenario 900 provides an example of how a non-copied SSTable may be restored to SSTables 332 of data repository 322. Scenario 900 occurs at a time T5, which is after time T4, and data repository 322 is being restored to its state at time T4. As shown in FIG. 8, the state of data repository 322 at time T4 comprised SSTables 332 with SSTable 701 and SSTable 601. While not described above, backup system 301, like most incremental backup systems, maintains information about the state of data repository 322 at each incremental backup so that the data repository 322 can be restored to any one of the incremental states. Thus, backup system 301 uses that information to determine that SSTable 701 and SSTable 601 should be restored to data repository 322.

Backup system 301 references ancestry map 341 at step 1 to determine whether SSTable 701 and SSTable 601 are stored in SSTables 331 of data repository 321. Data repository 321 indicates that SSTable 601 is stored in data repository 321 but that SSTable 701 is not. However, ancestry map 341 indicates that SSTable 701 is a compaction of ancestor SSTables 501-503. Backup system 301 therefore references entries in ancestry map 341 for SSTables 501-503, which indicate that that SSTables 501-503 are stored in data repository 321. Thus, to replicate SSTable 701, backup system 301 compacts SSTables 501-503 to create SSTable 701 at step 2 in a manner similar to that used by database system 302 to create SSTable 701 initially. The reproduced SSTable 701 is then restored at step 3, along with SSTable 601, to data repository 321. After restoration, SSTables 332 include the same SSTables that were included in SSTables 332 at time T4.

While backup system 301 performs the compaction to reproduce SSTable 701 in the above example, other examples may restore SSTable 701 in different manners. For instance, backup system 301 may provide the ancestor SSTables (SSTables 501-503 in the above example) to database system 302 and database system 302 may compact the ancestor SSTables itself (or otherwise handle the ancestor SSTables as is sees fit).

Figure 10:
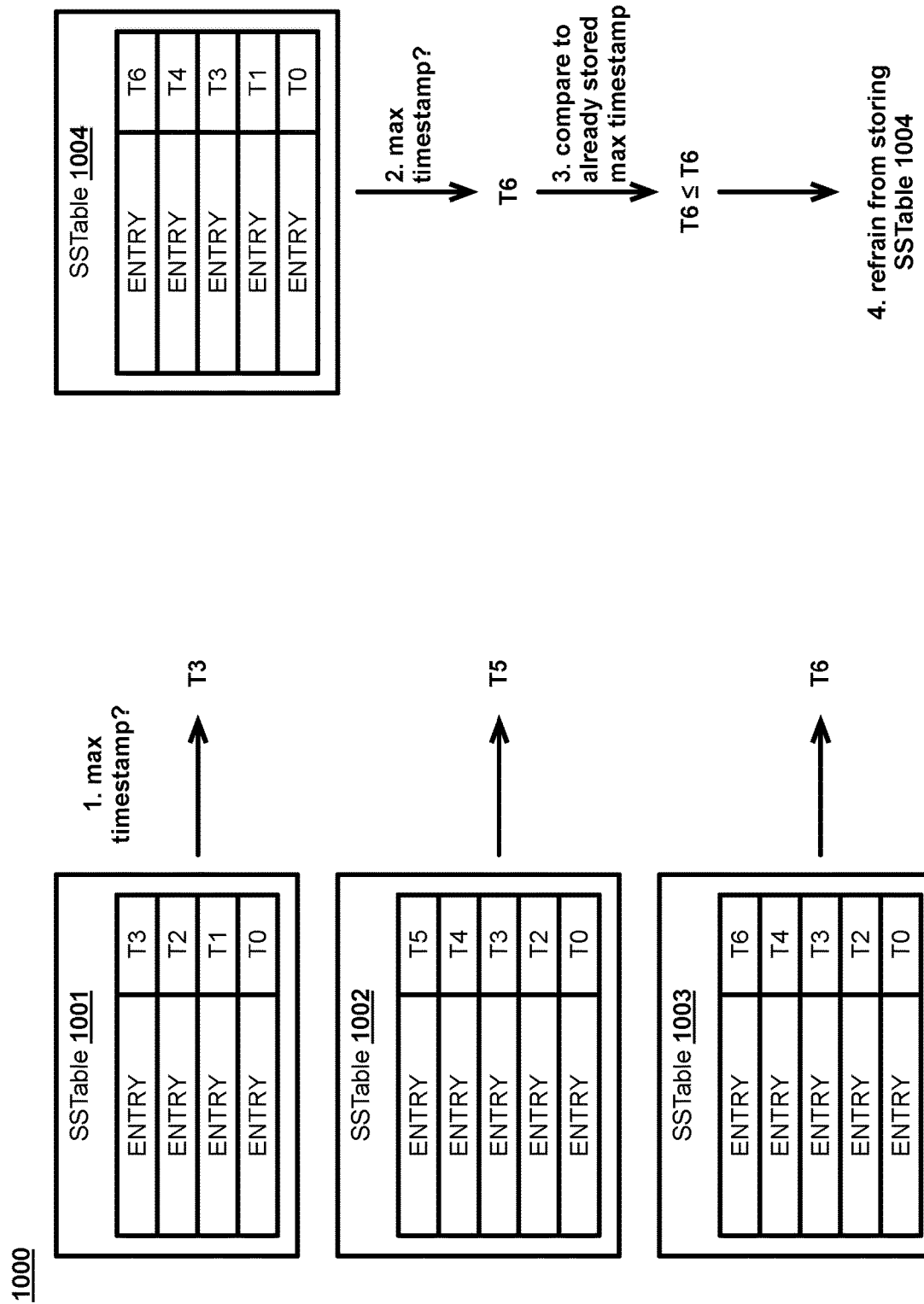
FIG. 10 illustrates another scenario for the other implementation to efficiently back up a compaction based database system.

FIG. 10 illustrates scenario 1000 for implementation 300 to efficiently back up a compaction based database system. In scenario 1000, backup system 301 uses timestamps for data entries within SSTables rather than ancestor information to determine whether an SSTable should be stored to data repository 321. SSTables 1001-1003 comprise SSTables already stored within SSTables 331 of data repository 321. SSTables 1001-1003 may have been stored in data repository 321 in response to previous iterations of scenario 1000. Scenario 1000 provides backup system 301 determining maximum timestamp of the data entries within SSTables 1001-1003 at step 1. The actual content of each data entry is not relevant to any of the determinations in scenario 1000. Preferably, backup system 301 determines the maximum timestamp of each SSTable 1001-1003 when storing each to data repository 321 and stores those maximum timestamps for later reference, although the maximum timestamps may be determined at some other time. Regardless, the maximum timestamps of SSTables 1001-1003 are T3, T5, and T6, respectively. It should be understood that timestamps T with higher numbers represent later timestamps (i.e., more recent entries) than those with lower numbers. Accordingly, backup system 301 determines that the maximum time stamp of SSTables 1001-1003, which are the SSTables already stored in data repository 321, is T6.

At a time after SSTables 1001-1003 have been stored to data repository 321, backup system 301 captures SSTable 1104 in a snapshot of SSTables 332. Database system 301 determines the maximum timestamp of data entries within SSTable 1004 at step 2. The maximum timestamp in SSTable 1004 is T6, which is then compared at step 3 to the maximum timestamp of the other SSTables (i.e., SSTables 1001-1003 in this example) already stored in data repository 321. Specifically, it is determined whether T6 is less than or equal to the maximum of already stored timestamps. In this case, T6 from SSTable 1004 is less than or equal to T6 from the previously stored SSTables 1001-1003. Since SSTable 1004 includes no entries with timestamps later than T6 and data repository 321 already stores data entries up to and including T6, backup system 301 assumes that SSTable 1004 does not include data entries not already included in SSTables 331 of data repository 321 and refrains from storing SSTable 1004 at step 4. In an alternative example, if SSTable 1004 had a maximum timestamp of T7, then T7 is determined to be greater than the previously stored maximum of T6. Accordingly, SSTable 1004 in that case includes at least one data entry newer than any of the data entries already stored in SSTables 331 of data repository 321 and SSTable 1004 will need to be stored to data repository 321 by backup system 301 to backup any newer entries therein.

Figure 11:
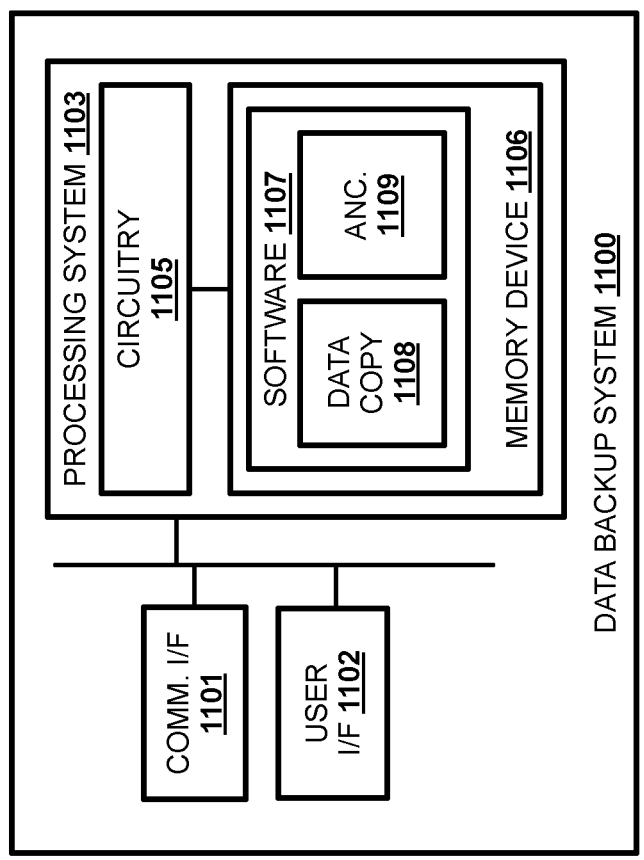
FIG. 11 illustrates a computing architecture for efficiently backing up a compaction based database system.

FIG. 11 illustrates data backup system 1100. Index system 1100 is an example of index system 101, although system 101 may use alternative configurations. Index system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user. User interface 1102 may include a keyboard, display screen, mouse, touch pad, or some other user input/output apparatus. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Operating software 1107 comprises computer programs, firmware, or some other form of machine-readable processing instructions. Operating software 1107 includes data copying module 1108 and ancestry module 1109. Operating software 1107 may further include an operating system, utilities, drivers, network interfaces, applications, or some other type of software. When executed by circuitry 1105, operating software 1107 directs processing system 1103 to operate index system 1100 as described herein.

In particular, data copying module 1108 directs processing system 1103 to back up two or more files from a first database system and, after backing up the two or more files, identify a subsequent file from the first database system for backup. Ancestry module 1109 directs processing system 1103 to determine that the subsequent file comprises a compaction of the two or more files and, responsively, refrain to back up the subsequent file.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of incrementally backing up compaction-based database systems, the method comprising:
   backing up two or more files from a first database system;
   after backing up the two or more files, identifying a subsequent file from the first database system for backup;
   determining that the subsequent file comprises a compaction of the two or more files; and
   based on a determination by query to an ancestry map that the subsequent file corresponds to ancestor information of the two or more files in the ancestry map, refraining to back up the subsequent file, the ancestry map including a list of files backed up to the first database system.

2. The method of claim 1, wherein backing up the two or more files comprises:
   at a first time, backing up one or more first files;
   after the first time, identifying a second file for backup; and
   determining that the second file does not comprise a compaction of the one or more first files and, responsively, backing up the second file.

3. The method of claim 1, wherein the subsequent file comprises a compaction of the two or more files when the subsequent file contains only information included in the two or more files.

4. The method of claim 1, wherein determining by query to the ancestry map comprises:
   accessing ancestor information for the subsequent file stored on the ancestry map; and
   determining that the ancestor information indicates that the subsequent file was created by compacting the two or more files.

5. The method of claim 4, further comprising:
   when backing up the two or more files, adding ancestry information to the ancestry map; and
   after determining that the subsequent file was created by compacting the two or more files, using the ancestry information to determine that the two or more files have already been backed up.

6. The method of claim 5, further comprising:
   adding subsequent ancestry information about the subsequent file to the ancestry map, wherein the subsequent ancestry information indicates that the two or more files are ancestors of the subsequent file.

7. The method of claim 1, wherein determining by query to the ancestry map that the subsequent file corresponds to ancestor information of the two or more files in the ancestry map comprises:
   determining a first maximum timestamp for data entries in the subsequent file; and
   determining that the first maximum timestamp is not greater than a maximum timestamp for data entries in the two or more files.

8. The method of claim 1, further comprising:
   identifying the subsequent file for restoration to the first database system;

compacting the two or more files to recreate the subsequent file; and restoring the subsequent file to the first database system.

9. The method of claim 1, further comprising:

identifying the subsequent file for restoration to the first database system;

determining that the two or more files are ancestors of the subsequent file; and restoring the two or more files to the first database system.

10. A system for incrementally backing up compaction-based database systems, the system comprising:

one or more computer readable storage media;

a processing system operatively coupled with the one or more computer readable storage media; and program instructions stored on the one or more computer readable storage media that, when read and executed by the processing system, direct the processing system to:

back up two or more files from a first database system;

after backing up the two or more files, identify a subsequent file from the first database system for backup;

determine that the subsequent file comprises a compaction of the two or more files; and based on a determination by query to an ancestry map that the subsequent file corresponds to ancestor information of the two or more files in the ancestry map, refrain to back up the subsequent file, the ancestry map including a list of files backed up to the first database system.

11. The system of claim 10, wherein to back up the two or more files, the program instructions direct the processing system to:

at a first time, back up one or more first files;

after the first time, identify a second file for backup; and determine that the second file does not comprise a compaction of the one or more first files and, responsively, backing up the second file.

12. The system of claim 10, wherein the subsequent file comprises a compaction of the two or more files when the subsequent file contains only information included in the two or more files.

13. The system of claim 10, wherein to determine by query to the ancestry map, the program instructions direct the processing system to:

access ancestor information for the subsequent file stored on the ancestry map; and determine that the ancestor information indicates that the subsequent file was created by compacting the two or more files.

14. The system of claim 13, wherein the program instructions further direct the processing system to:

when backing up the two or more files, add ancestry information to the ancestry map; and after determining that the subsequent file was created by compacting the two or more files, use the ancestry information to determine that the two or more files have already been backed up.

15. The system of claim 14, wherein the program instructions further direct the processing system to:

add subsequent ancestry information about the subsequent file to the ancestry map, wherein the subsequent ancestry information indicates that the two or more files are ancestors of the subsequent file.

16. The system of claim 10, wherein to determine by query to the ancestry map that the subsequent file corresponds to ancestor information of the two or more files in the ancestry map, the program instructions direct the processing system to:

determine a first maximum timestamp for data entries in the subsequent file; and determine that the maximum max timestamp is not greater than a maximum timestamp for data entries in the two or more files.

17. The system of claim 10, wherein the program instructions further direct the processing system to:

identify the subsequent file for restoration to the first database system;

compact the two or more files to recreate the subsequent file; and restore the subsequent file to the first database system.

18. The system of claim 10, wherein the program instructions further direct the processing system to:

identify the subsequent file for restoration to the first database system;

determine that the two or more files are ancestors of the subsequent file; and restore the two or more files to the first database system.

19. A computer readable storage medium having program instructions stored thereon for incrementally backing up compaction-based database systems, the program instructions, when executed by a processing system, direct the processing system to:

back up two or more files from a first database system;

after backing up the two or more files, identify a subsequent file from the first database system for backup;

determine that the subsequent file comprises a compaction of the two or more files; and based on a determination by query to an ancestry map that the subsequent file corresponds to ancestor information of the two or more files in the ancestry map, refrain to back up the subsequent file, the ancestry map including a list of files backed up to the first database system.

20. The system of claim 19, wherein to back up the two or more files, the program instructions direct the processing system to:

at a first time, back up one or more first files;

after the first time, identify a second file for backup; and determine that the second file does not comprise a compaction of the one or more first files and, responsively, backing up the second file.

* * * * *

UNITED STATES PATENT AND TRADEMARK OFFICE
CERTIFICATE OF CORRECTION

PATENT NO. : 10,877,934 B2  
APPLICATION NO. : 15/637374  
DATED : December 29, 2020  
INVENTOR(S) : Subramanyam et al.

Page 1 of 1

It is certified that error appears in the above-identified patent and that said Letters Patent is hereby corrected as shown below:

In the Specification

In Column 5, Line 23, delete "101" and insert --102-- therefor

In Column 5, Line 47, delete "1021" and insert --121-- therefor

In Column 10, Line 64, delete "301" and insert --302-- therefor

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*